United States Patent [19]

Klose et al.

[11] 4,382,963

[45] May 10, 1983

[54] LOW-CALORIE, SUGAR-FREE CHEWING GUM CONTAINING POLYDEXTROSE

[75] Inventors: Robert E. Klose, West Nyack; Ragnar E. Sjonvall, Eastchester, both of N.Y.

[73] Assignee: General Foods Corporation, White Plains, N.Y.

[21] Appl. No.: 319,360

[22] Filed: Nov. 9, 1981

[51] Int. Cl.³ .............................................. A23G 3/30
[52] U.S. Cl. ...................................... 426/3; 426/658
[58] Field of Search ....................................... 426/3-6, 426/548, 658

[56] References Cited

U.S. PATENT DOCUMENTS 3,766,165 10/1973 Lyme ................................. 426/548

OTHER PUBLICATIONS

Brochure Published by Pfizer.

*Primary Examiner*—Jeanette M. Hunter
*Attorney, Agent, or Firm*—Thomas A. Marcoux; Joseph T. Harcarik; Daniel J. Donovan

[57] ABSTRACT

A sugar-free, low-calorie chewing gum utilizing polydextrose as the sole soluble bulking agent. A non-sweet chewing gum with a snack-type flavor or a low-calorie sweetened gum with aspartame or saccharin.

6 Claims, No Drawings

_4,382,963_

LOW-CALORIE, SUGAR-FREE CHEWING GUM CONTAINING POLYDEXTROSE

TECHNICAL FIELD

This invention relates to the preparation of novel sugar-free, low-calorie chewing gum products utilizing polydextrose as the sole soluble bulking agent.

BACKGROUND ART

Sugarless confectionary compositions and in particular sugarless chewing gums have become desirable food items due to the efforts of the dental profession in discouraging the use of sucrose-containing confectionaries. Recently the United States Food and Drug Administration approved the Pfizer Inc. food additive petition for the use of polydextrose in specific food categories. Specifically, polydextrose was approved for use in chewing gums as well as numerous other applications. Polydextrose is a reduced calorie bulking, bodying, or texturizing agent which provides less than one calorie per gram. It is useful in replacing sugar, specifically acting as a substitute for the bulking activity of sugar, giving consistency and texture to food. However, polydextrose does not contain the sweetness properties normally associated with sugar. As such, therefore, polydextrose is not a sweetener and is not a substitute for saccharin.

Pfizer Inc., the manufacturer of polydextrose, in its promotional material advertising polydextrose in various food applications has included therein a recipe for a polydextrose chewing gum. However, Pfizer has only been able to utilize polydextrose to replace approximately 50% of the sorbitol (or sugar alcohol) which would normally be found in a conventional sugar alcohol gum formula. The use of polydextrose as the sole soluble bulking agent in a sugar-free gum was considered to be an unattainable objective because excessive stickiness made processing difficult. In order to make a polydextrose gum it was thought necessary to incorporate a significant amount of sugars and/or sugar alcohols to attain good processing parameters and to obtain a gum product possessing good organoleptic qualities.

It is an object of the present invention to prepare a low calorie chewing gum product possessing good textural and processing properties which is made using polydextrose as the sole bulking agent. Also, since polydextrose is not a sweetening agent the total replacement of polydextrose for the sugar or sugar alcohols normally present as bulking agents in the gum will allow the production of a non-sweet chewing gum which can be used with a snack-type flavor or alternatively a low calorie sweetened gum can be prepared with aspartame or another intensive low-calorie sweetener.

DISCLOSURE OF THE INVENTION

This invention relates to the preparation of a novel sugar-free, low-calorie chewing gum utilizing polydextrose as the sole soluble bulking agent. This invention permits the production of a gum without the presence of sugar or sugar alcohols which normally are present to provide bulk. Preparation of these low calorie sugarless gum products are made possible by omitting the aqueous component that is normally used in sugar gum (corn syrup) or sugarless gum with sugar alcohols (sorbitol syrup).

Sugar and sugar alcohols may be defined as bulking agents and generally comprise a major amount by weight of the total gum composition. The word, sugar, as defined in this application is meant to include sucrose, dextrose, corn syrup solids (their substitutes) and the like and mixtures thereof. Sugar alcohols, also known as polyols, include mannitol, sorbitol, xylitol, galactitol, glycerol, erythritol and the like and mixtures thereof.

Polydextrose is a food ingredient further described in U.S. Pat. No. 3,766,165 which is assigned to Pfizer, Inc. Polydextrose is a water soluble, randomly-bonded, condensation polymer of dextrose containing minor amounts of bound sorbitol and citric acid. Pfizer, Inc. has marketed polydextrose in two forms. It is available in a powdered acid form having a pH range in solution of about 2.5–3.5 and in a neutralized 70% solution which has a pH range of about 5–6. The neutral form of polydextrose is a viscous, hydroscopic, tacky solution which resembles sugar syrup and which is not easy to dry and even when dried often cakes to a hydroscopic sticky mass. The acid powder form of polydextrose, while it may be easier to use, is undesirable in many food applications including many chewing gum recipes because of its acidic nature. Applicants are able to produce unsweetened snack-type flavored chewing gums or artificially sweetened chewing gums which contain polydextrose as the sole bulking agent by using the neutralized form of polydextrose which has been previously sprayed dried. Alternatively grape, orange, lemon or cherry flavored, artifically sweetened gums may be prepared by using the powdered acidic form of polydextrose because those types of flavors are compatible with an acidic formula.

The key to obtaining a good quality gum product and avoiding excessive stickiness during processing is starting with a low-moisture containing polydextrose powder (below 5% moisture) and maintaining a low moisture content throughout all processing steps. Spray-dried, low-moisture, neutralized polydextrose was prepared from the neutralized 70% solution of polydextrose (Polydextrose Type N, Pfizer) by using a Whirljet type 1/1TC nozzle and the following spray-drying conditions:

| | |
|---|---|
| Inlet Air Temperature | 400° F. |
| Outlet Air Temperature | 230° F. |
| Airflow, Exhaust | 2800 cfm |
| Spray Pressure | 500 psig |
| Feed Concentration | 51.4% |
| Feed Temperature | 133° F. |
| Throughput Rate | 217 lbs. solids/hr. |

The spray-dried powder had a bulk density of 0.66 g./cc. and had a moisture content lower than 1.5%.

The use of 100% polydextrose as a bulking agent will yield a product which is non-sweet and is especially desirable where sweetness is detrimental to the final chewing gum product. Additionally the polydextrose will contain only one calorie per gram while the sugar alcohol or polyol typically contains on the range of 4 calories per gram. The incorporation of polydextrose as the sole bulking agent in the chewing gum product of the present invention results in a chewing gum product having a caloric density of under 1 calorie per gram.

According to the present invention a sugarless chewing gum composition is formed with from about 65 to 85% by weight of polydextrose, from about 15 to 35% by weight of a gum base with the remainder of a constituents present in the chewing gum consisting of softening agents, flavoring agents and coloring agents. Preferably polydextrose is present from 65 to 80% by weight of the gum and the gum base is present at a level of from about 20 to 30% by weight.

The final chewing gum product has a moisture content from about 1.0% to 5.0% by weight, preferably from 2.0% to 3.0%. The gum bases which may be employed in this invention may include masticatory substances of natural or synthetic origin, synthetic resins, waxes, fillers, and emulsifiers.

Flavor and color agents may be added to the chewing gum composition of this invention as desired. Flavoring agents include all natural, essential, or synthetic flavoring oils and compounds normally accepted for food use. Flavors such as wintergreen, spearmint, peppermint, birch, anise, fruit flavors, and the like may be used satisfactorily with the variety of gum bases. The amount of flavoring material is normally a matter of preference, but may be subject to the consideration of such factors as type of flavor used and the type of base used and the like. Generally, flavoring materials amount for about 1% by weight or less of the total gum composition.

Plasticizers or softeners such as lanolin, propylene glycol, glycerol, lecithin and the like as well as mixtures thereof may optionally be incorporated within the gum base to achieve a desired texture and consistency. Aspartame may optionally be incorporated in the chewing gum composition of the present invention and will contain 0.1% or more by weight basis, preferably from 0.3 to 0.7%. Alternatively, the chewing gum composition of the present invention may be combined with saccharin at a level of from 0.05% to 0.3% on a by weight basis preferably 0.1%.

This invention is further illustrated but not limited by the following examples.

EXAMPLE 1

A low-calorie sugarless chewing gum with polydextrose as the sole soluble bulking agent is prepared with aspartame incorporated as an intensive sweetener, as follows:

| Low-Calorie Spearmint Flavor Chewing Gum with Aspartame | |
|---|---|
| Ingredient | % Composition |
| Polydextrose, Type N (Neutralized), Spray Dried | 70.7 |
| Gum Base | 27.0 |
| Spearmint Flavor | 1.1 |
| Lecithin | 0.6 |
| Aspartame (APM) | 0.6 |
| | 100.00 |

PROCEDURE

The presoftened gum base and lecithin were added to the steam jacketed mixer (Sigma Mixer) and mixed at 45° C. for three minutes. Two-thirds of the polydextrose was added and mixing continued for an additional five minutes. The remaining one-third polydextrose and APM were pre-blended, added to the mixer, and mixing continued for one minute. The flavor was added and mixing continued for three minutes. The gum was removed from the mixer (final temperature 53° C.), then passed through sheeting rolls to a thickness of 0.0706 to 0.075". The sheets were tempered at 22° F./55% RH for 24 hours, then scored into sticks and packaged. The sticks were 2.75"×0.75" and weighed approximately 2.75 grams per stick.

The caloric content of each 2.75 gram stick was approximately 2 calories per stick, based on a caloric content of 1 calorie per gram of polydextrose. This compares to approximately 7-8 calories per stick of the same weight containing sugar or sugar alcohols incorporated as soluble bulking agents.

EXAMPLE 2

A low calorie, non-sweet chewing gum with a snack type flavor was prepared with polydextrose as the sole soluble bulking agent. No intensive sweetener was used in the formulation, in order to provide a bland, non-sweet background for the snack flavor.

| Low Calorie Pizza Flavored Chewing Gum | |
|---|---|
| Ingredient | % Composition |
| Polydextrose, Type N (Neutralized), Spray Dried | 71.6 |
| Gum Base | 27.0 |
| Lecithin | 0.6 |
| Pizza Flavor | 0.8 |
| | 100.0 |

The procedure used was the same as Example 1, except aspartame was omitted.

The caloric content was similar to Example 1.

EXAMPLE 3

A low calorie chewing gum with a sour or acid type flavor was prepared by using the acid powder form of polydextrose as the sole soluble bulking agent with a grape flavor and aspartame as an intensive sweetener.

| Low Calorie Grape Flavored Chewing Gum | |
|---|---|
| Ingredient | % Composition |
| Polydextrose (Powdered Acid form) | 70.5 |
| Gum Base | 27.0 |
| Grape Flavor | 1.3 |
| Lecithin | 0.6 |
| Aspartame | 0.6 |
| | 100.0 |

The procedure and caloric content is similar to Example 1.

We claim:

1. A sugar-free, unsweetened, chewing gum with a caloric density of less than one calorie per gram comprising from 65% to 85% by weight of spray-dried polydextrose having a moisture content of less than 5%, from 15% to 35% by weight of a gum base and a moisture content from 1% to 5% by weight.

2. The chewing gum of claim 1 which comprises from 65 to 80% polydextrose, from 20 to 30% gum base and a moisture content from 2.0 to 3.5%.

3. The chewing gum of claims 1 or 2 further comprising the addition of aspartame at a level of 0.1% or more on a by weight basis.

4. The chewing gum of claim 3 wherein the level of aspartame is from 0.3% to 0.7%.

5. The chewing gum of claims 1 or 2 further comprising the addition of saccharin at a level of from 0.05% to 0.3% on a by weight basis.

6. The chewing gum of claim 5 wherein the level of saccharin is from 0.075% to 0.20% on a by weight basis.

* * * * *